United States Patent [19]

Oishi et al.

[11] Patent Number: 4,496,118
[45] Date of Patent: Jan. 29, 1985

[54] MAGNETIC TAPE CASSETTE

[75] Inventors: Kengo Oishi; Osamu Suzuki, both of Kanagawa, Japan

[73] Assignee: Fuji Photo Film Co., Ltd., Kanagawa, Japan

[21] Appl. No.: 494,483

[22] Filed: May 13, 1983

[30] Foreign Application Priority Data

May 13, 1982 [JP] Japan .................. 57-68717

[51] Int. Cl.³ .................. G03B 1/04; G11B 15/32
[52] U.S. Cl. .................. 242/198; 360/132
[58] Field of Search .................. 242/197–200, 242/76; 360/93, 95, 132

[56] References Cited

U.S. PATENT DOCUMENTS 2,676,766  4/1954  Ross et al. .................. 242/76
3,557,360  1/1971  Aldridge .................. 242/199
3,801,042  4/1974  Dobson .................. 242/199
3,934,839  1/1976  Serizawa .................. 242/198
3,971,071  7/1976  Urayama .................. 360/132

Primary Examiner—Leonard D. Christian
Attorney, Agent, or Firm—Sughrue, Mion, Zinn, Macpeak, and Seas

[57] ABSTRACT

A magnetic tape cassette having a lower half portion with a photo-sensor inserting hole. The upper half is mated with the lower half to form a cassette body. A tape supplying reel and a tape winding reel are disposed in the body. A reel retaining plate of elastic material is employed for depressing the tops of the reels. The reel retaining plate is fixedly secured to an inner surface of the upper half of the cassette body which is in alignment with said photo-sensor inserting hole.

5 Claims, 3 Drawing Figures

MAGNETIC TAPE CASSETTE

BACKGROUND OF THE INVENTION

This invention relates to magnetic tape cassettes. In particular, it relates to a small video cassette in which a reel retainer depresses the tops of a pair of reel hubs to urge each hub in its axial direction, so that rotating centers are maintained when the tape is run.

Such a reel retaining plate when used in an ordinary size video cassette suitably depresses the centers of the upper surfaces of the reel hubs in order to smoothly rotate the reel hubs and satisfactorily run the tape. This improves the picture recording and reproducing characteristic of the cassette unit. The reel retaining plate is mounted on the upper cassette half (hereinafter referred to as "the upper half", when applicable). The reel retaining plate is curved in the direction of depression, or the hub top contacting parts of the reel retaining plate are partially bent, so that the end parts thereof lightly depress the tops of the reel hubs.

FIG. 1 shows a conventional reel retaining plate 3 of this type. The reel retaining plate 3 is supported according to a cantilever system as shown in FIG. 1. Therefore, the plate 3 should be rigidly mounted on the upper half. In FIG. 1, the plate 3 is fixedly secured to the upper half 1 at two points 7. If the plate 3 is not positively secured to the upper half 1, then, it is liable to have play associated with it and as a result, its ends 11 cannot uniformly depress the reel hubs. In this case, the tape will not smoothly run; i.e., the picture recording and reproducing characteristic is lowered. This drawback is significant in the case of a small video cassette, because its reel-retaining-plate mounting space is small. Thus, it is essential to improve the technique of mounting the reel retaining plate.

SUMMARY OF INVENTION

Accordingly, an object of this invention is to overcome the above-described problem of prior art devices.

The foregoing and other objects of the invention have been achieved by the provision of a magnetic tape cassette comprising: the lower half having a photo-sensor inserting hole; the upper half which is mated with the lower half to form a cassette body. A tape supplying reel and a tape winding reel are disposed therein. A reel retaining plate of elastic material depresses the tops of the reels. In accordance with this invention, the reel retaining plate is fixedly secured to the inner surface of the upper half which is in alignment with the photo-sensor inserting hole.

This invention will be described in greater detail by reference to the accompanying drawing and the description of the preferred embodiment that follows.

DESCRIPTION OF THE PREFERRED EMBODIMENT

Figure 1:
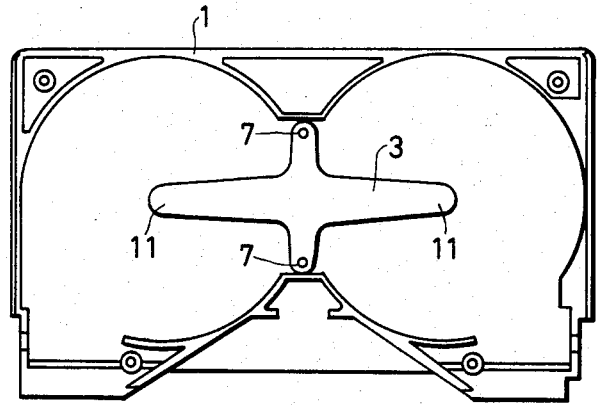
FIG. 1 is a plan view of the upper half of a conventional video cassette.
Figure 3:
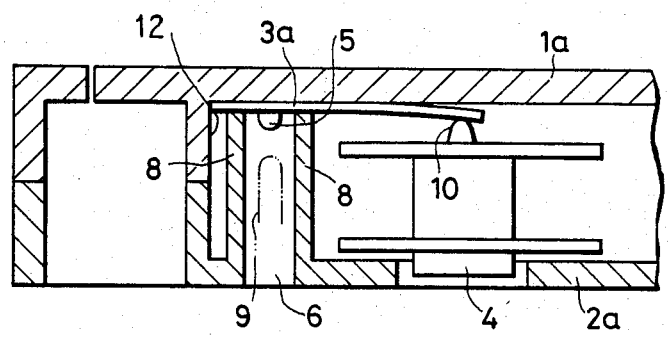
FIG. 3 is a sectional view of the same.
Figure 2:
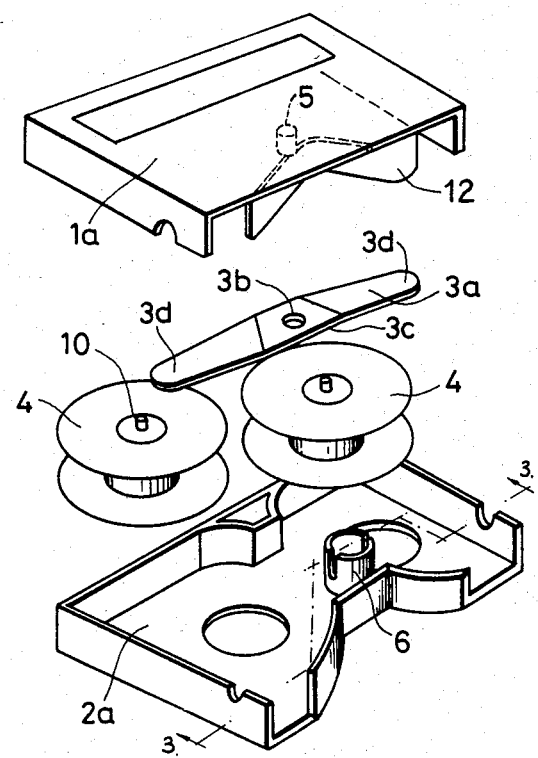
FIG. 2 is an exploded perspective view showing one embodiment of this invention.

According to the invention, the reel retaining plate is fixedly secured to the upper half, for instance, by ultrasonic welding, and its position is fixed by the sidewall of the upper half. This embodiment is shown in FIGS. 2 and 3. FIG. 2 is an exploded perspective view of the magnetic tape cassette according to the embodiment. FIG. 3 is a sectional view showing a portion of the complete cassette.

In FIGS. 2 and 3, reference character 1a designates the upper half. A pin 5 is provided on the inner surface of the upper half 1a. The pin 5 is inserted into a hole 3b in an elastic member, namely, a retaining plate 3a. In this condition, the pin 5 is welded by ultrasonics so that the retaining plate 3a is fixedly secured to the upper half 1a. The plate 3a may also be secured to the upper half utilizing pressurizing methods, heating methods, or adhesive applying methods instead of the above-described ultra-sonic method.

When the plate 3a is secured to the upper half, a side 3c of the retaining plate 3a is fixedly positioned against the inner surface of a sidewall 12 of the upper half 1a so that the retaining plate 3a is firmly fixed. Accordingly, the ends 3d of the retaining plate 3a positively depress the reels 4 by contact with the hub 10. The pin 5 is in alignment with a photo-sensor inserting hole 6 cut in the lower half 2a. Accordingly, the size of the pin 5 should be limited so that it does not obstruct the insertion of a photo-sensor 9. As shown in FIG. 3, the retaining plate 3a can be held between the sidewall 8 of the photo-sensor inserting hole 6 and the upper half, so that it is more positively fixed.

The cassette sidewall is utilized as a retaining-plate fixing reinforcing member. Thus, according to the invention, the reel retaining plate can be positively mounted on the upper half, which contributes to a miniaturization of the video cassette.

We claim:

1. A magnetic tape cassette comprising: upper and lower half portions joined to define a cassette body, said lower half portion having a photo-sensor insertion hole, a tape supply reel and a tape winding reel disposed in said cassette body, an elastic reel retaining plate for depressing the tops of said reels and, means for securing said retaining plate to an inner surface of said upper half portion in alignment with said photo-sensor insertion hole.

2. The magnetic tape cassette of claim 1, wherein said means for securing comprises a pin fixed to said upper half portion, said elastic reel retaining plate having a hole engaging said pin, and said retaining plate adhered to said upper half portion.

3. The magnetic tape cassette of claim 1, wherein said upper half portion has an inner sidewall and said retaining plate abutting against said inner wall to fixedly secure it in position.

4. The magnetic tape cassette of claim 1, wherein said insertion hole is defined by an upwardly extending wall from said lower half portion, said elastic retaining plate being fixed between the top of said extending wall and the inner surface of said upper half portion.

5. The magnetic tape cassette of claim 1, wherein each of said tape supply reel and tape winding reel has a hub associated therewith, and said elastic retaining plate has downwardly extending arms to engage hubs associated with each of said reels.

* * * * *